(12) United States Patent
de Kock et al.

(10) Patent No.: US 7,395,907 B2
(45) Date of Patent: Jul. 8, 2008

(54) SHOCK ABSORBER WITH FREQUENCY-DEPENDENT DAMPING

(75) Inventors: Paul de Kock, Numansdorp (NL); Adrianus Antonius Wilhelmus de Ruiter, Heesch (NL)

(73) Assignee: Koni B.V. (NL)

( * ) Notice: Subject to any disclaimer, the term of this patent is extended or adjusted under 35 U.S.C. 154(b) by 0 days.

(21) Appl. No.: 10/494,804

(22) PCT Filed: Nov. 6, 2002

(86) PCT No.: PCT/NL02/00708

§ 371 (c)(1),
(2), (4) Date: Oct. 6, 2004

(87) PCT Pub. No.: WO03/040586

PCT Pub. Date: May 15, 2003

(65) Prior Publication Data

US 2005/0045440 A1   Mar. 3, 2005

(30) Foreign Application Priority Data

Nov. 6, 2001   (NL) .................................... 1019313

(51) Int. Cl.
*F16F 9/34* (2006.01)
(52) U.S. Cl. .................. 188/322.15; 188/313; 188/316; 137/614.2
(58) Field of Classification Search ............ 188/322.15, 188/313, 316, 317, 283, 281, 282.6, 282.8; 137/493.9, 614.2, 516.11, 516.13
See application file for complete search history.

(56) References Cited

U.S. PATENT DOCUMENTS

| 4,660,686 | A | | 4/1987 | Munning et al. | |
|---|---|---|---|---|---|
| 4,723,640 | A | * | 2/1988 | Beck | 188/282.3 |
| 4,732,408 | A | | 3/1988 | Ohlin | |
| 4,854,429 | A | | 8/1989 | Casey | |
| 5,085,299 | A | | 2/1992 | Spiess et al. | |
| 5,129,488 | A | * | 7/1992 | Furuya et al. | 188/282.6 |
| 5,184,703 | A | * | 2/1993 | Van Zeggeren | 188/282.3 |
| 5,248,014 | A | * | 9/1993 | Ashiba | 188/282.8 |
| 5,392,883 | A | | 2/1995 | Huang | |

(Continued)

FOREIGN PATENT DOCUMENTS

DE           2242990           3/1974

(Continued)

*Primary Examiner*—Melody M. Burch
(74) *Attorney, Agent, or Firm*—Bachman & LaPointe, P.C.

(57) ABSTRACT

Shock absorber containing a flow channel (16), provided with a valve assembly, made in the piston section. This valve assembly is designed to be actuated hydraulically. To this end there is an auxiliary chamber (22, 42) which on one side is eliminated by a movable valve body (18). This valve body is provided with an inlet for oil from the flow channel to the auxiliary chamber. There is an outlet (21, 41) (that can be closed off). The surface area of the valve body acting on the valve seat (19) is less than the surface area of the valve body in the auxiliary chamber, so that fluid flowing through the inlet of the valve body results in an increase in the volume of the auxiliary chamber and thus in closing movement of the valve body. Because filing of the auxiliary chamber takes some time, a frequenncy-dependend closing characteristic of the flow channel is obtained.

12 Claims, 5 Drawing Sheets

U.S. PATENT DOCUMENTS

| | | |
|---|---|---|
| 5,467,852 A | 11/1995 | de Kock |
| 5,890,568 A | 4/1999 | de Kock et al. |
| 6,264,015 B1 | 7/2001 | de Kock et al. |
| 6,360,857 B1 * | 3/2002 | Fox et al. .................... 188/281 |

FOREIGN PATENT DOCUMENTS

DE    3534298 A1 *    4/1987

* cited by examiner

SHOCK ABSORBER WITH FREQUENCY-DEPENDENT DAMPING

BACKGROUND OF THE INVENTION

The present invention relates to a shock absorber comprising a cylinder section and a piston section that van be moved therein, the piston section and cylinder section each being provided with fixings for connection with the parts that can be moved with respect to one another and said piston section being sealed with respect to said cylinder section in order to delimit chambers on either side thereof, a firsts chamber close to the fixing of said piston section and a second chamber close to the fixing of said cylinder section, a connecting channel being arranged between said chambers for connecting said chambers, said connecting channel containing a valve assembly for influencing the fluid steam through said connecting channel, comprising a valve seat and a part that can move with respect thereto under liquid pressure and seals off the valve seat, said movable part of the valve assembly forms a boundary wall of an auxiliary chamber, said auxiliary chamber being provided with an inlet which, viewed in the direction of the movement of the fluids opens upstream of said valve assembly.

Shock absorbers of this type are generally known in the art. These are used in a wide variety of vehicles, the aim being to adapt the damping characteristics to the driving conditions. Auxiliary flow channels and main flow channels are employed. En the case of minor liquid movement damping can take place in the auxiliary flow channel, whilst in the case of more substantial liquid movements in the shock absorber the main flow channel with its own damping characteristics is also effective. These constructions react directly to the liquid movement, that is to say corresponding to the speed of movement of piston and cylinder section with respect to one another, the various valves are opened and closed. A frequency-dependent control by means of retarding the damping characteristics with respect to the mutual movement of piston/cylinder by hydraulic means is not known.

Electronic controls have been proposed in the art for providing an electronic delay in the build-up of force. That is to say, in the case of a large number of movements in rapid succession the damping is restricted, whilst more damping occurs in the case of a movement of longer duration. Although they are effective, electronic controls of this type are of particularly complex construction. Particularly rapid sensors, computation units and actuators are needed to enable the valves present to react sufficiently quickly.

A device with which a ball can be moved in an auxiliary chamber is described in U.S. Pat. No. 4,660,686. In the rest position this ball assumes a position such that the volume of the auxiliary chamber is maximum. This ball beans on a spring plate, which sprig plate is able to close off an opening located beneath it. When pressure is applied in the direction in which the spring plate opens, pressure is also applied to the rear of the ball. Because the diameter of the ball is greater than the diameter of the opening close to the valve plate, with identical pressure the force of the ball on the valve plate will be greater and the valve plate will closed. A relief valve is present in the liquid feed channel to the rear of the ball and when a specific value is exceeded this relief valve will open, as a result of which the pressure on the rear of the ball decreases and the valve plate will thus be opened to a greater or lesser extent. That is to say, depending on the pressure in the system, the valve plate will be open to a greater or lesser extent. This reaction is immediate, that is to say without any delay.

In U.S. Pat. No. 5,392,883 a device is described consisting of an auxiliary chamber in which there is an opening with a valve under slight spring pressure which operates in one direction, which valve is also provided with an opening, which, however, has a smaller passageway. In the rest position the volume of the auxiliary chamber is minimum. Here again, adjustment of the flow opening takes place immediately (delay of at most a few milliseconds) in response to the pressure conditions.

SUMMARY OF THE INVENTION

The aim of the invention is to provide a shock absorber with which frequency-dependent damping can be obtained by hydraulic means, that is to say a construction with which a greater or lesser resistance to flow is created depending on the duration of the mutual movement of piston/cylinder and not on the pressure prevailing therein.

This aim is realised with a shock absorber as described above, in that in the non-loaded state the volume of said auxiliary chamber can be increased with respect to the initial or rest volume under the influence of the liquid issuing through said inlet.

According to the present invention, an auxiliary chamber of variable volume is provided. The liquid flowing into this auxiliary chamber will increase the volume of the auxiliary chamber and move the movable part of the valve assembly towards the stationary part of the valve assembly, as a result of which the throttling effect is obtained. The volume of the auxiliary chamber is minimal in the rest position and the volume thereof is increased only by filling with damping liquid.

Because it takes some time (tens of hundreds of milliseconds) to fill the auxiliary chamber sufficiently and to build up pressure to provide (further closing) movement of the valve body, a hydraulic frequency-dependent control can be provided.

In order to be able to control the characteristics of the additional damping obtained in this way in an optimum manner, that is to say gradually to provide further throttling action, according to an advantageous embodiment of the invention the effective surface area of the boundary wall that is subjected to the pressure of the liquid which flows into the auxiliary chamber decreases as the volume of the auxiliary chamber increases. That is to say, the greater the extent to which the movable part of the valve assembly bears against the stationary part of the valve assembly (seat), the smaller is the surface area that is under the influence of the pressure in the auxiliary chamber, as a result of which the closing movement is retarded or even terminates before complete closing. A throttling characteristic which builds up gradually is obtained by this means. As described above, this effect arises with a time delay.

With this arrangement the connecting channel with associated valve assembly can be arranged either in the shock absorber or outside it. If the connecting channel is arranged in the shock absorber it is preferably made in the piston section. However, it is also possible to arrange the various parts outside the shock absorber. The valve assembly can be connected to both the fat and the second chamber with the aid of pipes or channels. External influencing of the behaviour of the valve assembly can optionally be achieved with a construction of this type.

In all cases the structural variants described below can be used. For instance, the auxiliary chamber can be provided with an outlet to allow the liquid to flow away.

It is possible to achieve the increase in volume of the auxiliary chamber essentially by means of the movable part of the valve assembly itself. That is to say this movable part or the valve body executes an appreciable movement during which increasing pretension on the valve plate is obtained. According to another variant a diaphragm can be present in the auxiliary chamber. This diaphragm can, moreover, operate the movable part of the valve assembly.

The frequency characteristics of the absorber obtained in this way can be adapted as desired in a wide variety of ways. Possibilities are the selection of the bore of the inlet of the auxiliary chamber, selection of the surface area of the valve body in the auxiliary chamber, selection of the surface area of the valve body compared with the valve seat and selection of the volume of the valve body. Moreover, the pressure build-up in the auxiliary chamber can be influenced by influencing the outlet of the auxiliary chamber. This can be effected both by means of selection of the size of the outlet and by means of fitting a (spring-loaded) shut-off valve therein. Further variants will be clear to those skilled in the art.

The invention can be employed both in the main flow channel and in the auxiliary flow channel of an absorber.

According to an advantageous embodiment of the invention, the closing movement of the valve body is a movement along the longitudinal axis of the shock absorber oriented towards the first chamber.

A restriction can be made in the connecting channel to provide initial throttling. Optionally, it is possible to be able to influence this restriction from the outside using means that are known in the art. According to an advantageous embodiment, a bore is made in the valve body in the inlet for the auxiliary chamber. As a result a complicated bypass is not needed, but a direct connection is produced between the connecting channel and the auxiliary chamber.

The valve body can be constructed as a piston, optionally in combination with a diaphragm and spring plate.

Furthermore, it is possible to construct the valve seat/valve body with a variable first surface. That is to say the effective closing surface area of the valve body can be relatively large during a first portion of the closing movement and smaller during a second portion, as a result of which the second portion of the closing movement is executed more rapidly because the second surface of the valve body remains constant. The valve body can be so sized that the effective rigidity of the closing surface increases during closure.

BRIEF DESCRIPTION OF THE DRAWINGS

The invention will be explained in more detail below with reference to illustrative embodiments shown in the drawing.

In the drawing.

DETAILED DESCRIPTION OF THE PREFERRED EMBODIMENTS

Figure 1:
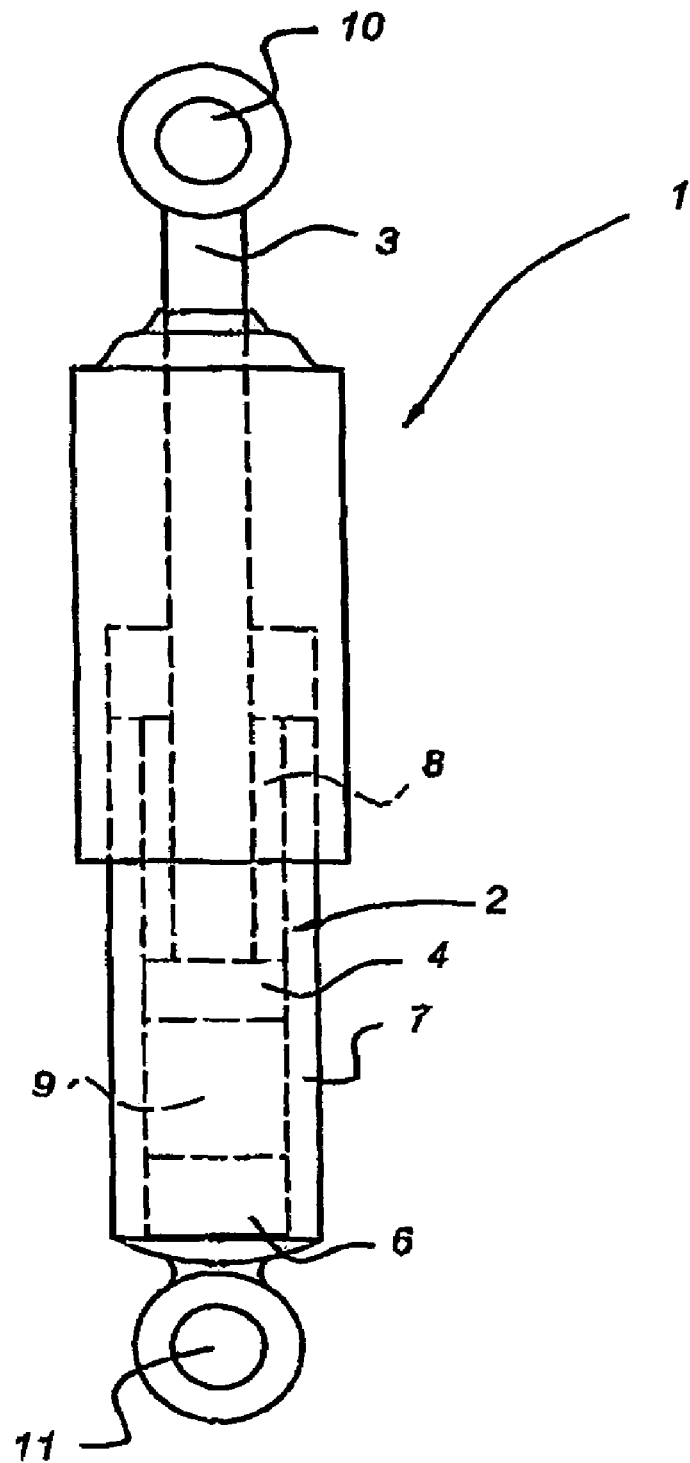
FIG. 1 shows, highly diagrammatically, a general view of a shock absorber.

In FIG. 1 a shock absorber is indicated in its entirety by 1. This comprises a cylinder section 2 and a piston section 3. The piston section 3 comprises a piston 4 which delimits two chambers located opposite one another inside the cylinder section. A first chamber is indicated by 8 and a second chamber by 9. The piston section 3 can be fixed to, for example, vehicle bodywork through an eye 10. Eye 11 serves, for example, for fixing to part of the suspension system of a vehicle. The shock absorber shown here is of the type where the cylinder section 2 contains an annular channel 7 for storing absorber fluid and where there is a bottom valve 6 which connects second chamber 9 to this fluid reservoir 7. It must be understood that the invention can be employed with any type of absorber, in which content them may or may not be an external reservoir which can be constructed in some way known in the art.

The construction of the piston section 3 in interaction with the cylinder section 2 is of importance for the present invention. More particularly, the present invention relates to a valve construction with which the behaviour of the liquid stream from the first chamber 8 to the second chamber 9, that is to say when the connecting eyes 10, 11 move apart, can be influenced as a function of the duration of such a movement.

Figure 2:
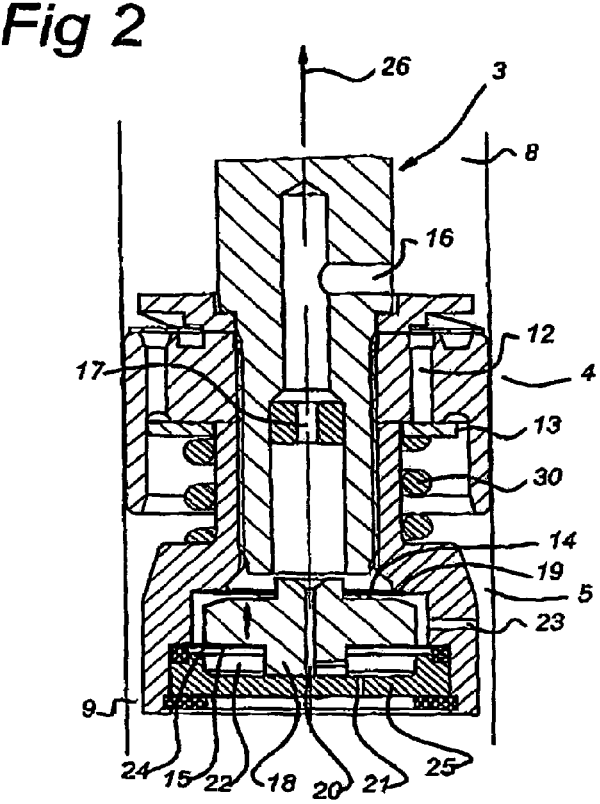
FIG. 2 shows a detail of a first embodiment of the piston section according to the invention.

A detail of the piston section 3 is shown in FIG. 2. The direction of movement described above is indicated by arrow 26. Piston section 3 consists of two parts, a main part 4 and an auxiliary part 5. In the main section 4 on the one hand, a valve construction is fitted which influences the flow from the second chamber 9 to the first chamber 8, that is to say in the case of an absorber movement in the direction opposed to arrow 26. Because such a valve system is not of importance for understanding of the present invention and for the scope of protection, this will not be discussed further.

Furthermore, there are two possible connections between first chamber 8 and second chamber 9 in the case of movement in the direction of the arrow 26.

A first main passageway is formed by a number of main flow channels 12. These can be closed off by a (polygonal) plate valve 13, which is driven into the closed position with the aid of spring 30. The present invention can also be used with other bypass constructions known from the state of the art. On movement in the direction of arrow 26, the liquid pressure built up as a result will, in the case of sufficiently rapid movement, overcome the force of spring 30 and a connection between first chamber 8 and second chamber 9 will be produced via main flow channels 12.

Piston section 3 furthermore has an auxiliary part 5. It can be seen from FIG. 2 that this is not provided with a seal with resect to cylinder section 2. There is an auxiliary flow channel 16 in piston section 3. A restriction 17 has been made in this auxiliary flow channel. Auxiliary flow channel 16 terminates in a valve seat 19. A valve body 18, on which valve 14 bears, is fitted interacting with valve seat 19. This valve 14 optionally closes against valve set 19. On the opposite side the valve body 18 and more particularly the diaphragm 24 joined thereto has a second surface that is indicated by 15. The second surface 15 has a larger area than the first surface. An inlet 20 extends through the valve body. This is the inlet of an auxiliary chamber 22 that on one side is delimited by the valve body/diaphragm 24 described above and on the other side by closing wall 25 that is joined firmly (and in a sealed manner) to auxiliary part 5. An outlet 21 has been made this closing wall 25. The outlet of the auxiliary flow channel 16 is indicated by 23.

Figure 2A:
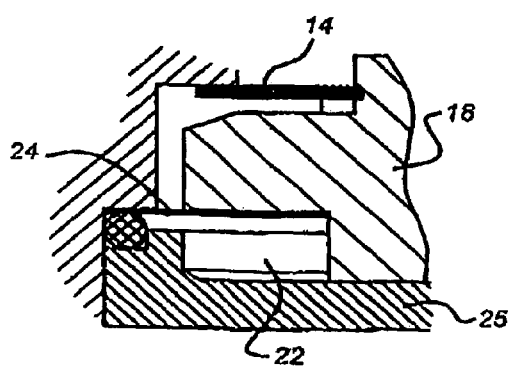
FIG. 2a shows a detail according to FIG. 2 in a first position.

A detail of FIG. 2 is shown in FIGS. 2a and b. FIG. 2a shows the rest position.

When the piston section 3 moves in the direction of arrow 26 (see also FIG. 2b) liquid will be moved through auxiliary flow channel 16, a first regulation of the damping characteristics taking place with the aid of restriction 17. The mayor proportion of the liquid will move away through outlet 23 into second chamber 9. A proportion thereof will issue through inlet 20 into apiary chamber 22. Because the outlet 21 has a flow resistance, the pressure will rise in chamber 22. As a result the valve body 18 will move towards the valve seat 19, that is to say the volume of the chamber 22 will become greater. Valve body 18 moves, inter alia, towards valve seat 19 because the area below diaphragm 24 is larger than the first surface 14. Theoretically, the surface area could be essentially the same. When the valve body 18 moves towards valve seat 19 the liquid stream between valve 14 and valve seat 19 skill be throttled, as a result of which less liquid is able to move away via the outlet from the auxiliary flow channel 23 and damping occurs.

Figure 2B:
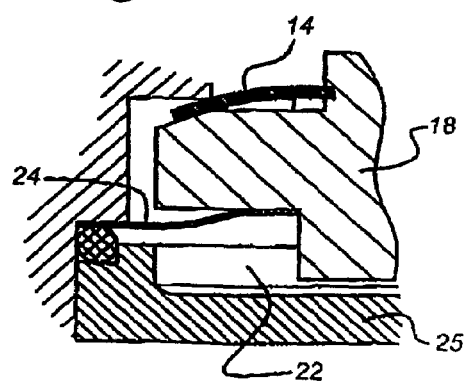
FIG. 2b shows a detail according to FIG. 2 in a second position.

Because the filling of chamber 22 takes some time—after all the volume of liquid has to be moved—it Ill be understood that the closure of valve 14 is time-dependent. The closing movement is also pressure-dependent. Closure will take place more rapidly with a higher liquid flow trough auxiliary flow channel 16. However, the time characteristic is the most important. In FIG. 2b it is shown that when valve body 18 moves upwards the contact surface with diaphragm 24 is smaller because this separates from valve body 18 near the edges. As a result the effective surface area of valve body 18 on which the effective pressure within chamber 22 acts decreases. Sizing is such that when the pressure in chamber 22 increases the effective surface area on which the pressure within chamber 22 acts on the valve body 18 decreases in such a way that a gradual closing effect at valve seat 19 is obtained In the position shown in FIG. 2a valve 14 bears with relatively low force on seat 19, as a result of which liquid is able to flow past relatively easily. That is to say, in the case of a short, rapid movement plate 19 opens easily and the damping will be softer.

In the position shown in FIG. 2b plate 19 is under appreciable pretension. That is to say, in the case of a longer rapid movement plate 19 will open to liquid less easily and the damping will be harder. The hardening of the damping over time (from position in FIG. 2a to position in FIG. 2b) can, for example, be proportional or logarithmic.

A frequency-dependent characteristic of a damping can be achieved with a construction of this type. It must be understood that in the example according to FIG. 2 this damping relates only to the auxiliary flow channel. That is to say, in the case of more rapid movements the effect will be appreciably restricted by the presence of the main flow channels 12. However, it is possible to omit such main flow channels or appreciably to restrict the cross-sectional dimension thereof.

Figure 3:
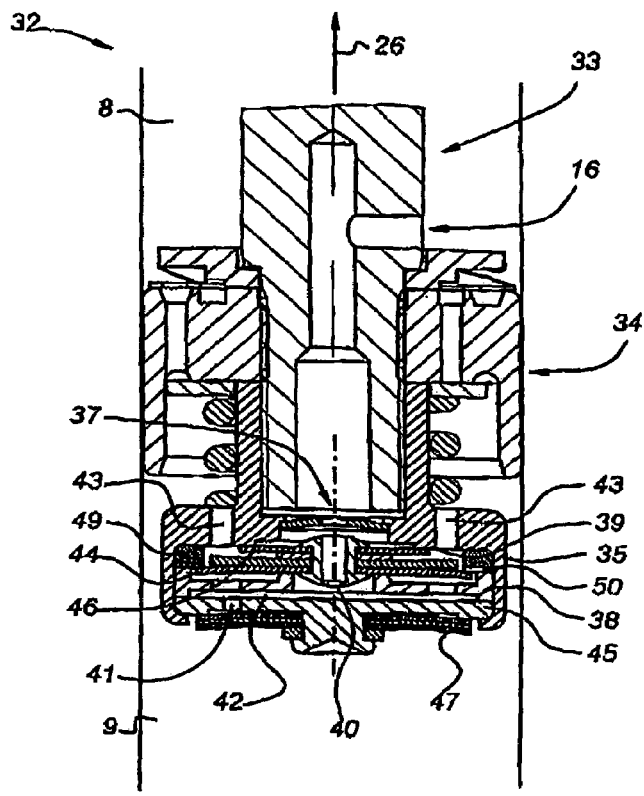
FIG. 3 shows a detail of a second embodiment of the piston section according to the present invention.

A second variant of the invention is shown in FIG. 3. In this embodiment as well the piston section 33 consists of a main section 34 and an auxiliary section 35. Main section 34 corresponds to the a section 4 except for the restriction 17. That is to say, with this embodiment as well there are a number of main flow channels, as well as a connecting channel 16.

The auxiliary section 35 has been modified in this embodiment. As in the case of the embodiment according to FIG. 2, here again there is no seal between the side wall of the auxiliary section 35 and the cylinder section. An auxiliary chamber is indicated by 42. As in the case of the embodiment according to FIG. 2 this is provided with an inlet 40. Restricted discharge of liquid is also possible via the outlet or slit 50 made in the spacer ring, as a result of which this liquid is moved via outlet 43 to chamber 9. Auxiliary chamber 42 is delimited by a valve body 44 and by end wall 45 as well as a part of auxiliary section 35. Support ring 38 is fitted in a fixed position. Valve body 44 consists of a deformable plate 51 which constitutes a limit of the auxiliary chamber 42. Part 51 presses against a rigid part 52 that is joined via an intermediate rig to closing plate 46. This can interact with a valve set 39. There is a restriction 37 in the auxiliary flow channel 16 and this has the same effect as restriction 17. A diaphragm 44 is arranged below closing plate 46.

The pack 44-46 is held together by a fixing such as a rivet in which the inlet 40 has been made.

Outlet orifice 41 can be closed off by a resilient plate pack 47.

Figure 3A:
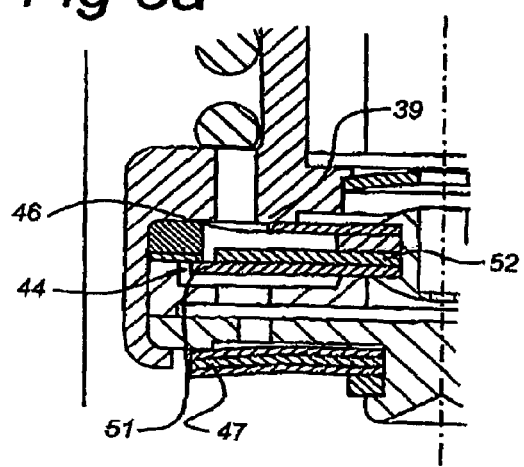
FIG. 3a shows a detail according to FIG. 3 in a first position.
Figure 3B:
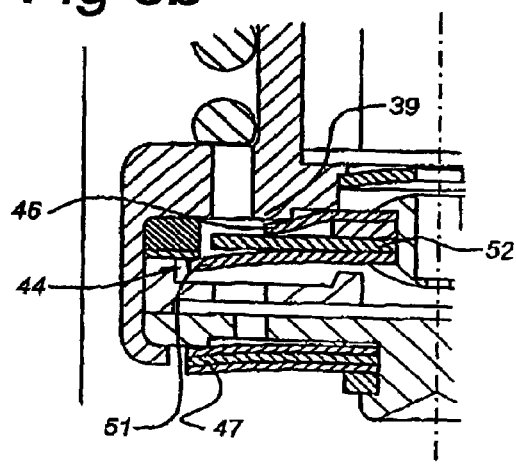
FIG. 3b shows a detail according to FIG. 3 in a second position.

The construction according to FIG. 3 functions as follows when it moves in the direction of arrow 26, starting from FIG. 3a, without the main flow channels 12 becoming effective. Oil flows through auxiliary flow channel 16 throttled by restriction 37 and past valve 46 towards outlet 43. Some of the liquid will flow through auxiliary bore 40 into chamber 42. This liquid is not able to exit via outlet 41 because of the effect of resilient plate pack 47 that closes off this opening. As a result the volume of between the auxiliary chamber will be increased by deformation of the diaphragm 44. This will result in closing plate 46 being pressed further onto the seat, as a result of which the oil flow between valve seat 39 and closing plate 46 is throttled. The pressure in chamber 42 is prevented from rising too high through the opening of outlet 41 as a result of resilient plate 47 moving away. Because plate 52 is rigid, on movement in the direction of arrow 26 plate 51 will press against plate 52 over a smaller surface area, as a result of which the effective surface area of plate 52 that is subjected to the pressure in the auxiliary chamber decreases. This is illustrated in FIG. 3b.

However, with this embodiment as well it takes some time to fill chamber 42 with liquid to such an extent that closure by the valve body takes place.

Figure 4:
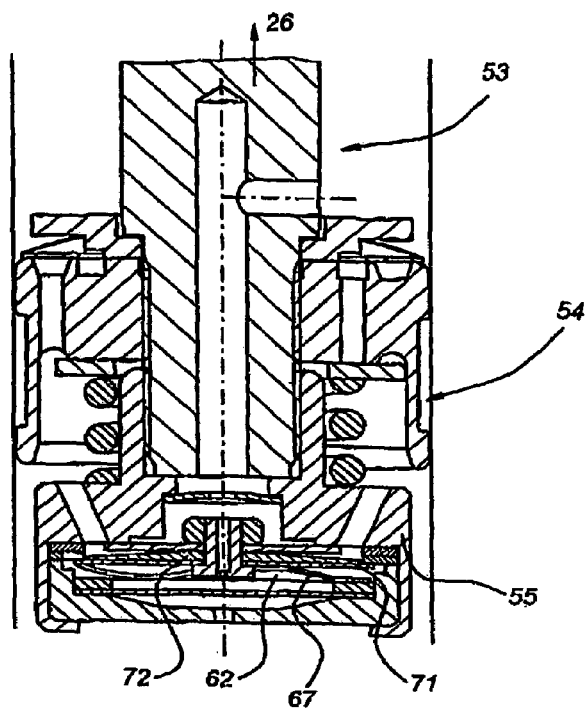
FIG. 4 shows a detail of a third embodiment of the piston section according to the resent invention.
Figure 4A:
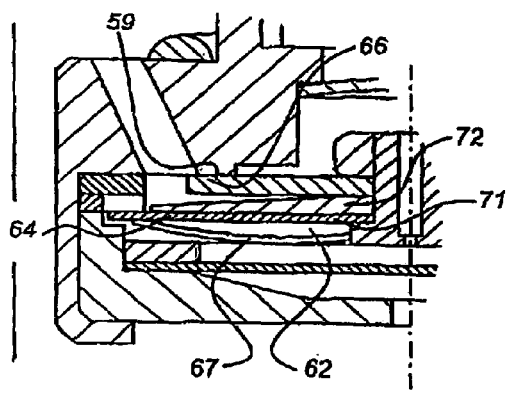
FIG. 4a shoes a detail according to FIG. 4 in a first position.
Figure 4B:
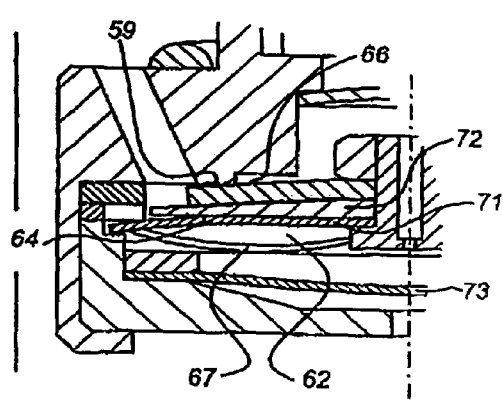
FIG. 4b shows a detail according to FIG. 4 in a second position.

A further variant of the present invention is shown in FIG. 4. As before, FIG. 4a shows the rest position and FIG. 4b the position after movement in the direction of arrow 26. The variant shown in FIG. 4 has a piston section 53 consisting of a main section 54 and an auxiliary section 55. Main section 54 corresponds to main section 34, leaf springs being used instead of a helical spring. The auxiliary section has been modified somewhat compared with the variant shown in FIGS. 3a and b. The valve body is indicated by 64. This consists of a rigid plate 72 and a sealing diaphragm plate 71. There is also a closing plate 66. In contrast to the embodiment shown in FIG. 3, there is no resilient plate pack 47. Furthermore, there is an auxiliary spring 67 underneath diaphragm 71. The valve seat with which valve body 64 interacts is indicated by 59.

On movement in the direction of arrow 26 the auxiliary chamber 62 will be filled with liquid. At the same time, if the movement of the piston rod relative to the cylinder is sufficiently rapid, liquid will flow past the plate 66 loaded under low pension by spring 67. When the pressure in auxiliary chamber 62 rises, both plate 73 (compensation plate) will move outwards and diaphragm 71 will become curved. On further movement in the direction of the arrow 26 the area of the diaphragm that is in contact with part 72 will decrease. As a result of the presence of spring 67, the contact force of plate 66 on the seat can be determined very accurately. That is to say it will be possible in particular accurately to control the damping during brief violent shocks (soft damping).

The variants described above describe a frequency-dependent damping. The frequency at which the valve body 18, 46 starts to close and completely closes is selected depending on the parameters of the vehicle concerned. In general this frequency is between 1 and 10 Hertz.

Figure 5:
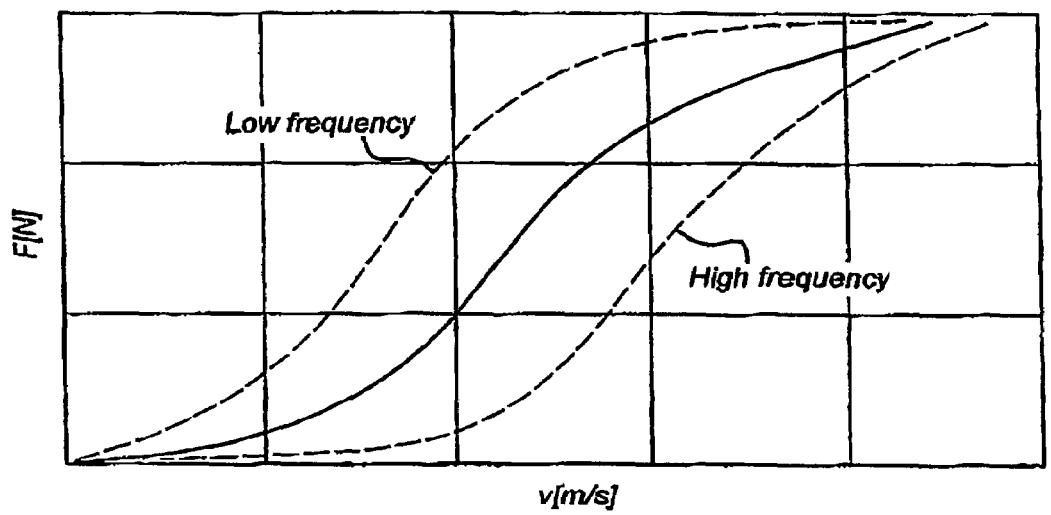
FIG. 5 shows the force/speed characteristic of a shock absorber according to the invention at different frequencies.

The force/speed characteristic is shown diagrammatically in FIG. 5 as an example. The central continuous line shows a conventional optimised damping characteristic. Variants of the invention are indicated by a broken line to the left and right of this continuous line. The left-hand broken line represents damping at a relatively low frequency of approximately 1 Hertz and the right-hand line represents damping at a relatively high frequency such as 10 Hertz. It can clearly be seen that the damping characteristics can be adapted to the driving conditions.

After reading the above description, further variants which fall within the scope of the appended claims will be immediately apparent to those skilled in the art.

The invention claimed is:

1. Shock absorber, comprising:
   a cylinder section and a piston section that can be moved therein, the piston section and cylinder section each being provided with fixings for connection with parts that can be moved with respect to one another and said piston section being sealed with respect to said cylinder section in order to delimit first and second chambers on either side thereof,
   said first chamber being close to the fixing of said piston section and said second chamber being close to the fixing of said cylinder section,
   a connecting channel being arranged between said first and second chambers for connecting said first and second chambers, said connecting channel containing a valve assembly for influencing a fluid stream through said connecting channel,
   said valve assembly comprising a valve seat, a movable part that can move with respect to the valve seat under liquid pressure, and a closing plate to seal on said valve seat, said movable part forming a boundary wall of an auxiliary chamber, said auxiliary chamber being provided with an inlet which, viewed in the direction of the movement of the fluid, opens upstream of said valve assembly, wherein said auxiliary chamber is provided with an outlet opening downstream of said valve assembly, and wherein the volume of said auxiliary chamber can be increased with respect to initial or rest volume under the influence of liquid issuing through said inlet, resulting in further pressing of the closing plate to said valve seat, and wherein an effective surface area of said movable part that is exposed to pressure in the auxiliary chamber decreases as the volume of said auxiliary chamber increases.

2. Shock absorber according to claim 1, wherein said connecting channel is made in the piston section.

3. Shock absorber according to claim 1, wherein said movable part comprises a movable valve body that provides for the change in volume of said auxiliary chamber.

4. Shock absorber according to claim 1, wherein said auxiliary chamber contains a movable diaphragm.

5. Shock absorber according to claim 1, wherein, viewed in the direction of movement of liquid in said connecting channel, a restriction is arranged upstream of said valve body in said connecting channel, wherein the effective throughput of said restriction can optionally be influenced from the outside.

6. Shock absorber according to claim 1, comprising a further connecting channel through said piston section for connecting said first and second chamber.

7. Shock absorber according to claim 1, wherein the flow resistance of said outlet is greater than the flow resistance of said inlet.

8. Shock absorber according to claim 1, wherein pressure-dependent valve is fitted in a second outlet of the auxiliary chamber.

9. Shock absorber according to claim 1, wherein the movable part is movable by fluid entering the auxiliary chamber, along an axis of the shock absorber, from a rest position to a moved position, and wherein the movable part pushes the closing plate against the valve seat in the moved position.

10. Shock absorber according to claim 1, wherein the movable part comprises a substantially rigid member movable along an axis of the shock absorber, and wherein the closing plate is mounted to the movable part.

11. Shock absorber according to claim 3, wherein the closing plate is mounted between the valve seat and the movable valve body.

12. Shock absorber, comprising:
    a cylinder section;
    a piston section movable within the cylinder section, the piston section being sealed with respect to the cylinder section in order to define a first chamber on one side of the piston section and a second chamber on the other side of the piston section;
    a connecting channel arranged between the first chamber and the second chamber;
    a valve assembly in the connecting channel for influencing a fluid stream through the connecting channel, the valve assembly comprising a valve seat and a movable part which is movable with respect to the valve seat; wherein the movable part comprises a closing plate for sealing on the valve seat and a movable valve body, wherein the closing plate is between the valve seat and the movable valve body, the movable part forming a boundary wall of an auxiliary chamber, the auxiliary chamber having an inlet and an outlet, wherein the inlet opens upstream of the valve assembly, and the outlet opens downstream of the valve assembly, and wherein a volume of the auxiliary chamber can be increased with respect to an initial or rest volume by movement of the movable part relative to the valve seat under influence of liquid entering the auxiliary chamber through the inlet, wherein movement of the movable part under influence of the liquid entering the auxiliary chamber results in pressing of the movable valve body against the closing plate, and the closing plate against the valve seat, and wherein an effective surface area of said movable part which is exposed to pressure in the auxiliary chamber decreases as the volume of said auxiliary chamber increases.

* * * * *